United States Patent
Kostuch

(10) Patent No.: US 6,334,894 B1
(45) Date of Patent: *Jan. 1, 2002

(54) TREATMENT OF MINERAL PARTICLES

(75) Inventor: Jacek Antoni Kostuch, Cornwall (GB)

(73) Assignee: Imerys Minerals Limited (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/341,507
(22) PCT Filed: Nov. 12, 1998
(86) PCT No.: PCT/GB98/03426
   § 371 Date: Jul. 12, 1999
   § 102(e) Date: Jul. 12, 1999
(87) PCT Pub. No.: WO99/24360
   PCT Pub. Date: May 20, 1999

(30) Foreign Application Priority Data

Nov. 12, 1997 (GB) .............................. 9723818

(51) Int. Cl.$^7$ .............................. C01B 33/40; B01J 8/14
(52) U.S. Cl. ..................... 106/486; 106/416; 501/145; 501/150
(58) Field of Search ................. 106/416, 486; 501/145, 150

(56) References Cited

U.S. PATENT DOCUMENTS

| 4,381,948 A | * | 5/1983 | McConnell et al. ........ 501/145 |
| 4,427,452 A | * | 1/1984 | Jeffs ..................... 501/150 |
| 5,011,534 A | | 4/1991 | Berube et al. |
| 5,397,754 A | | 3/1995 | Iannicelli et al. |
| 5,551,975 A | | 9/1996 | Freeman et al. |

FOREIGN PATENT DOCUMENTS

| EP | 0 068 853 | 1/1983 |
| FR | 2 030 738 | 11/1970 |
| WO | WO 98/03256 | 1/1998 |

OTHER PUBLICATIONS

Meinhold et al., "A comparison of the kinetics of flash calcination of kaolinite in different calciners", Transactions of the Institute of Chemical Engineers, vol. 72, Part A, pp. 105–113, XP 002091435, Jan. 1994.*

Bridson et al., "Properties of flash–calcined kaolinite", Clays and Clay Minerals, vol. 33, No. 3, pp. 258–260, XP 002091436, Jun. 1985.*

Mehinhold R.H. et al., "A Comparison of the Kinetics of Flash Calcination of Kaolinite in Different Calciners", Chemical Engineering Research & Design, Part A: Transactions of the Institute of Chemical Engineers, vol. 72, No. A1, Jan. 1994, pp. 105–113.

Bridson D. et al., "Properties of Flash–Calcined Kaolinite", Clay and Clay Minerals, vol. 1, No. 3, Jun. 1985, pp. 258–260.

English language Derwent Abstract of FR 2 030 738 Nov. 1970.

* cited by examiner

Primary Examiner—Michael Marcheschi
(74) Attorney, Agent, or Firm—Finnegan, Henderson, Farabow, Garrett & Dunner, L.L.P.

(57) ABSTRACT

A method of heat treating kaolin particles which includes the steps of establishing in a furnace a heating zone suitable to calcine the particles and passing the particles rapidly through the heating zone whereby the particles are flash calcined in the heating zone, wherein the furnace is of the kind in which a toroidal fluid flow heating zone is established and the particles are heated in the said heating zone to a temperature of at least 800° C. but not greater than 1100° C. by application to the particles of a temperature increase rate greater than $10^3$ Celsius degrees per second to give a rapid blistering of the particles caused by rapid dehydroxylation of the kaolin and wherein the particles have a residence time of less than 1 second in the said toroidal fluid flow heating zones.

11 Claims, No Drawings

TREATMENT OF MINERAL PARTICLES

The present invention relates to the treatment of mineral particles. In particular, it relates to the heat treatment by flash calcining of mineral particles suitable to be employed as coating, filler and extender materials in products such as papers, polymers, paints, cements, concretes and the like. Such minerals include, for example, clays especially kaolins processed or produced by various processes such as grinding or precipitation.

Calcination is a known process wherein particles of a material, eg mineral, are heated. In flash calcining the particles are heated extremely quickly, almost instantaneously. In contrast, in the alternative process of soak calcining heating is carried out at a more gentle rate.

Prior art methods of flash calcining have one or more disadvantages. For example, in fluid bed type furnaces it is necessary, in order to treat certain feed particulate materials, to establish an inert coarse particle bed in the furnace before introduction of the feed material to ensure efficient heating of the feed material. Also, if the feed material contains fluxing agents there is a likelihood above a certain temperature, eg 900° C., that fluxed material will build up on the resident bed causing efficient operation of the system to be hindered or, eventually, the system to stall.

In other cases, the particles come into direct contact with combusting fuel. Particles passing through the hottest part of the flame tend to be overheated which can cause the product to be abrasive. Also it is difficult to ensure that the particles are all treated at a uniform temperature and product quality is difficult to control.

In still further prior art methods, the flash calcination treats only the exterior parts of the particles and a further calcination step, with considerable expense, is required to give suitably complete flash calcination of the particles.

In any case, it is desirable to improve certain product properties compared with those obtained using the prior art methods.

It is an object of the present invention to carry out flash calcining of mineral particles by a method which reduces or eliminates the above disadvantages and which provides improved product properties.

According to the present invention in a first aspect there is provided a method of heat treating kaolin particles which includes the steps of establishing in a furnace a heating zone suitable to calcine the particles and passing the particles rapidly through the heating zone whereby the particles are flash calcined in the heating zone, wherein the furnace is of the kind in which a toroidal fluid flow heating zone is established and the particles are heated in the said heating zone to a temperature of at least 550° C. by application to the particles of a temperature increase rate greater than $10^3$ Celsius degrees per second to give a rapid blistering of the particles caused by rapid dehydroxylation of the kaolin and the particles have a residence time of less than 1 second in the said toroidal fluid flow heating zone.

Furnaces of the toroidal fluid flow kind are known per se. Such furnaces are described for example in U.S. Pat. No. 4,479,920 and WO96/03256. Usually, a hot gas is passed through gaps between angled blades or vanes in a ring of blades or vanes provided in the operational chamber or reactor part of the furnace. The blade ring is formed in an annular gap between the wall of the chamber and a central block, eg an upwardly pointing conical portion, located on the axis of the chamber. Gas flow is caused to follow a rotary path in a doughnut shaped region around the block and in individual swirls within the rotary path. This provides heat transfer to material, eg particulate material, to be heated in the gas flow.

Although heating of particulate materials in a toroidal fluid flow heating device is well known and use of such a device has been mentioned for heat treatment of kaolin in WO98/03256, such devices are not used industrially in the kaolin industry for kaolin treatment. Use of such a device to provide flash calcining of kaolin in accordance with the invention and the benefits to be obtained have not previously been suggested.

The transformations of kaolinite (the principal constituent of kaolin) on heating are known. A significant peak in the differential thermal analysis at 550–650° C. denotes the formation of metakaolin from hydrous kaolin by a hydroxylation reaction:

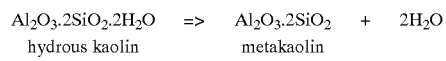

$$Al_2O_3.2SiO_2.2H_2O \Rightarrow Al_2O_3.2SiO_2 + 2H_2O$$
hydrous kaolin         metakaolin This is a strongly endothermic reaction and it is the evolution of water of which use is made to give flash calcined kaolin unique properties as follows.

During flash calcination, kaolin particles are subject to extreme temperature gradients, eg from ambient to 550° C. or higher in fractions of a second. This causes the water vapour generated from the reaction to expand extremely rapidly, in fact faster than it can diffuse through the crystal structure of the particle. The pressures generated are sufficient to produce sealed voids as the interlayer hydroxyl groups are driven off, and it is these swollen interlayer spaces, or voids or blisters, between the kaolin platelets, which typify flash calcined kaolins and give them their characteristic properties, as described later.

Thus, in the method of the present invention the kaolin particles are heated to a temperature greater than 550° C., preferably a temperature in the range 800° C. to 1100° C., more preferably 900° C. to 1050° C., preferably 950° C. to 1000° C., by application to the particles of a temperature increase rate greater than $10^3$ Celsius degrees per second, eg at least $5\times10^3$ Celsius degrees per second, in some cases at least $10^4$ Celsius degrees per second, whereby rapid dehydroxylation to give the required blistering effect described above.

The delivery of mineral particles into the toroidal fluid flow heating zone in the method according to the first aspect of the present invention is desirably carried out by injection of the particles dispersed from one another in a carrier fluid. This ensures that the particles are not in contact with one another when they are rapidly heated in the toroidal fluid flow. Such contact can cause fluxing and fusing of particles and leads to a product which can be abrasive. Such abrasiveness is undesirable. For example, where the product is to be employed in paper making, eg as a coating or filler material, it can harm the paper making machinery.

The carrier fluid may comprise a gas such as air or inert gas which may be initially blown over a source of the particles to be suspended in it or to which the particles may be added to carry them into the furnace. The carrier fluid may be at ambient temperature eg a temperature of from 15° C. to 30° C. although it could if required be heated.

The rate at which heat is transferred from carrier fluid to entrained particles is largely dependent on the boundary layer which surrounds each particle. This boundary layer is an envelope of carrier fluid which is stationary relative to the particle and which acts as an insulator, thus limiting heat transfer rate. If this layer can be disrupted, faster heat transfer will occur. Relative motion between the air and particle causes an increase in heat transfer due to convection and a decrease in the depth of the stationary air layer. For particle Reynolds numbers in the range 20–2,000 the following equation is applicable:

$$Nu=2+0.69Re^{0.5}Pr^{0.33}$$

where:

the Nusselt number, $Nu=hd/k$ the Reynolds number, $Re=pud/\mu$ and the Prandtl number, $Pr=c_p \mu/k$ This means that as the relative velocity (u) between the carrier gas and the particle increases, the heat transfer coefficient (h) rises due to a decrease in thickness of the boundary layer. The required relative velocity can be obtained by use of the toroidal fluid flow heating device.

By suspending particles in jets of hot air, which may be formed in the fluid flow heating zone, where much of the high velocity component is in the horizontal plane, it is possible to subject particles to impact velocities in excess of their terminal velocity. This allows very efficient heat transfer whilst retaining sufficient residence time in the reactor for the entire particle size range of the kaolin particles to undergo the required dehydroxylation reaction.

The required rapid heating temperature gradient may be achieved by adjustment of the temperature of the heating zone of the furnace and the rate at which gas to form the toroidal fluid flow heating zone is delivered to the heating chamber of the furnace and/or the rate at which the particles to be heated are delivered into the chamber and/or the rate at which calcined particles are extracted from the chamber. The operational controls of the furnace as supplied by the manufacturer can suitably be adjusted to give the required gradient. The furnace may for example be a TORBED® 400 reactor supplied by Torftech Ltd, Mortimer UK adapted to operate at higher temperatures as described in WO98/03256.

The mineral particles are preferably dispersed in a minimum amount of suspending fluid, eg air, to give efficient heating of the particles in the flash calcination process. Preferably, the density of the particles in the carrier fluid is as high as possible without the particles having substantial contact with one another when injected into the heating zone. The particles to be delivered into the heating zone of the furnace may be suspended in a flow of fluid, eg air, by use of a pressurised chamber. Kaolin particles contained in such a chamber may be forced at an adjustable rate from the chamber into a rotating member, eg disc, whose speed of rotation can be adjusted to give a required flow rate and density. A distributor may be employed to distribute a flow of the particles in fluid from a single source into the heating chamber of the furnace via a plurality of inlet delivery conduits. The particle flow may be designed in accordance with techniques well known in the pneumatic conveyance of particulate materials, eg as described in Powder Handling and Processing Volume 2 Number 3, September 1990.

The furnace in which the flash calcination in the method according to the first aspect is carried out preferably is of the form described in WO98/03256, the contents of which are incorporated herein by reference. The kaolin particles may be injected into the heating zone of the furnace via a plurality of inlet ports extending radially into the reactor or heating chamber of the furnace whereby the particles are injected into the reactor laterally into the toroidal fluid flow heating zone.

By carrying out flash calcination of mineral particulate material in a furnace of the kind described in WO98/03256 it is possible to avoid the problem of build-up of feed material and material produced therefrom and the need for consequent stoppage of the process and cleaning of the operational chamber of the furnace. In such a furnace, the internal constructional features ensure that the temperature of the critical surfaces inside the operational chamber of the furnace are kept below the sintering temperature of the feed particulate material to be treated in the furnace thereby avoiding significant accretion of material on such surfaces.

As described earlier, the method according to the first aspect of the present invention gives for flash calcining of kaolin very efficient gas-solid contacting and high impact velocities which in turn provide numerous process benefits including:

(i) Improved energy efficiency; in "massive" prior art structures such as tunnel kilns, multiple hearth kilns (Herreschoff type) and fluid-beds the large structural surface area leads to radiation losses contributing greatly to thermal losses. The toroidal fluid flow furnace allows by its design limitation of such losses, but if required the use of heat recovery systems can further improve the thermal energy efficiency of the system.

(ii) Improved process kinetics. This is achieved through the use of high velocity fluid flow streams which can be tolerated, despite the fineness of the particles being treated, in the toroidal fluid flow furnace. The effect is that all factors which can affect process kinetics are limited. A high thermal gradient is maintained calcination products (eg water) are driven away as they form and the insulating gas layer which surrounds particles is thinned continuously.

(iii) Improved product quality control; the rapid processing rate enabled by the factors described above allows the furnace to be a compact unit with a small amount of material in the processing zone at any one time (eg for a 5 tph plant approximately 25 kg needs to be in processing chamber). Any variation in product quality can be corrected by varying processing conditions with a rapid feedback of the effect of changes made.

The present invention is especially beneficial in the flash calcination of hydrated kaolin clays such as kaolinitic clays, eg containing at least 50 per cent by weight hydrated kaolin, eg obtained from china clay or ball clay. By use of the present invention calcined kaolin material can be produced in which voids having a more uniform size and spatial distribution through the particles than those produced by prior art methods can be obtained and this beneficially gives better control over the quality of the product.

The treated particulate material may comprise a material which for example forms at least 90%, eg at least 98% by weight kaolinite. The kaolin particulate material which is to be treated by the method of the invention may have been treated by known beneficiation procedures to have suitable starting properties. The material may be comminuted eg by grinding or milling to have a suitable particle size distribution and particle dispersion. The feed particles employed may be substantially all smaller than 0.5 $\mu$m. The mean particle size by weight may be in the range 0.5 $\mu$m to 15 $\mu$m. The feed particles may for example have a particle size distribution such that at least 50% by weight has an average particle size less than 2 $\mu$m. The treated particulate flash calcined kaolin material extracted from the chamber of the furnace may be cooled and treated by one or more known procedures, eg comminution, eg milling to break down aggregates and/or particle size classification, eg using a cyclone.

In general, the particle size distribution which may be obtained for the flash calcined product may be similar to that of the feed material. This is another benefit of the invention.

Quite unexpectedly, the specific gravity or density of products obtained by such dehydroxylation of hydrated kaolin using the method according to the first aspect of the invention can be lower than those obtained by prior art flash calcination methods. For example, flash calcined kaolins having a specific gravity of less than 2.04, in some cases below 2.02, even below 2.00 can be obtained. This is highly beneficial in applications wherein the product is to be used as filler or extender material added to a host material and it is desirable to minimize the specific gravity so that more of the added material can be employed without increasing the weight and reducing the strength of the host material.

An example of such application in which the specific gravity is important in this way is the use of the flash calcined mineral particles for adding to paints and polymers and latex coating materials as fillers and extenders.

Products obtained by use of the method according to the first aspect which are flash calcined kaolins for example, may therefore be especially useful as high opacity, low specific gravity extenders for adding to paints. The lower specific gravity allows the paint manufacturer to replace more of the expensive pigment $TiO_2$, normally employed as opacifier in paints, with the less expensive flash calcined kaolin. The flash calcined kaolin may comprise up to 40% by weight of the paint composition, the amount depending on the type of paint.

According to the present invention in a second aspect there is provided a flash calcined mineral particulate material, eg kaolin, produced by the method according to the first aspect.

The product may have the properties defined earlier and in the later claims.

Embodiments of the present invention will now be described by way of example with reference to the following illustrative examples.

EXAMPLE

A kaolin having the following composition was created in a furnace of the kind described in WO98/03256.

| Constituent | Weight Percentage |
| --- | --- |
| $SiO_2$ | 48 |
| $Al_2O_3$ | 37 |
| Other oxides | 2 |
| (Loss on Ignition | 13) |

The kaolin was treated in the furnace by flash calcining at a control temperature of 970° C. in two separate runs using a residence time of less than 0.5 sec and a heating rate temperature gradient of >10$^{4°}$ C. sec$^{-1}$.

The products after flash calcining showed the following properties:

| Run 1 | Specific Gravity | 1.99 |
| --- | --- | --- |
| | Brightness | 89.4 |
| | Yellowness | 3.8 |
| | Percentage of particles less than 2 μm in size (as measured by Sedigraph 5100 machine) | 62.3 |
| Run 2 | Specific Gravity | 1.98 |
| | Brightness | 89.4 |
| | Yellowness | 3.7 |
| | Percentage of particles less than 2 μm in size (as measured by Sedigraph 5100 machine) | 62.2 |

The products were suitable for use in paint compositions.

EXAMPLE 2

Paint compositions could be made in a known way, eg by mixing the required ingredients in a blender. A typical matt emulsion formulation which could be made using the flash calcined clay produced as in Example 1, is as follows:

| Ingredient | Weight percentage |
| --- | --- |
| water | 12.7 |
| $TiO_2$ | 15.0 |
| calcined kaolin | 10.0 |
| chalk | 14.0 |
| dispersant | 0.4 |
| ammonia solution | 0.1 |
| defoamer | 0.2 |
| biocide | 0.1 |
| thickening agent | 18.0 |
| 20% sodium hexametaphosphate solution | 0.8 |

The above ingredients may be mixed in a blender with a blade speed of 4000 revs per minute, after which the following are added:

| propylene glycol | 0.8 |
| --- | --- |
| coalescing solvent | 1.5 |

The mixture formed may be mixed for S minutes at a blade speed of 1500 revs per minute, after which the following are added:

| emulsion resin | 18.2 |
| --- | --- |
| water | 8.2 |
| | 100.0 |

The mixture formed is further mixed at 1500 revs per minute.

What is claimed is:

1. A method of heat treating kaolin particles, comprising: establishing in a furnace a toroidal fluid flow heating zone, passing the particles rapidly through the heating zone, and heating the particles in the heating zone (i) to a temperature of at least 800° C. but not greater than 1100° C., (ii) at a rate greater than $10^3$ Celsius degrees per second, and (iii) for a residence time of less than 1 second, such that the particles have rapid blistering caused by rapid dehydroxylation of the particles.

2. A method according to claim 1, wherein the rate is at least $5 \times 10^3$ Celsius degrees per second.

3. A method according to claim 2, wherein the residence time is less than 0.5 second.

4. A method according to claim 1, wherein the kaolin particles are delivered into the heating zone dispersed in a carrier fluid.

5. A method according to claim 4, wherein the carrier fluid comprises air.

6. A method according to claim 4, wherein the density of particles in the carrier fluid is substantially as high as possible.

7. A method according to claim 1, wherein the temperature is from 900° C. to 1050° C.

8. A method according to claim 1, wherein at least 50% by weight of the particles to be treated are kaolinite.

9. A method according to claim 8, wherein at least 90% by weight of the particles to be treated are kaolinite.

10. A method according to claim 1, wherein said particles are heated such that said particles form uniformly spaced and sized blisters.

11. A method according to claim 1, wherein said particles are heated such that said rapidly blistered particles have a specific gravity of less than 2.04.

* * * * *